(12) United States Patent  
Masuda

(10) Patent No.: US 6,862,131 B2  
(45) Date of Patent: Mar. 1, 2005

(54) LASER LIGHT GENERATING APPARATUS AND METHOD

(75) Inventor: Hisashi Masuda, Tokyo (JP)

(73) Assignee: Sony Corporation, Tokyo (JP)

( * ) Notice: Subject to any disclaimer, the term of this patent is extended or adjusted under 35 U.S.C. 154(b) by 163 days.

(21) Appl. No.: 10/119,011

(22) Filed: Apr. 10, 2002

(65) Prior Publication Data

US 2002/0171912 A1 Nov. 21, 2002

(30) Foreign Application Priority Data

Apr. 11, 2001 (JP) ........................................ 2001-112682

(51) Int. Cl.$^7$ ............................. G02F 1/35; G02F 2/02; H01S 3/108
(52) U.S. Cl. ........................ 359/326; 359/330; 372/21
(58) Field of Search ............................... 359/326–332; 372/21–22

(56) References Cited

U.S. PATENT DOCUMENTS

| | | | | |
|---|---|---|---|---|
| 5,134,622 | A | * | 7/1992 | Deacon ........................ 372/21 |
| 5,206,868 | A | * | 4/1993 | Deacon ........................ 372/21 |
| 6,088,379 | A | * | 7/2000 | Owa et al. .................... 372/97 |
| 6,285,691 | B1 | * | 9/2001 | Kaneda et al. ................. 372/33 |
| 2002/0036820 | A1 | * | 3/2002 | Merriam et al. ............. 359/330 |

FOREIGN PATENT DOCUMENTS

| | | | | | |
|---|---|---|---|---|---|
| JP | 11251666 | A | * | 9/1999 | ........... H01S/3/085 |
| JP | 11317567 | A | * | 11/1999 | ............. H01S/3/23 |

OTHER PUBLICATIONS

T.W. Hansch, et al., "Laser Frequency Stabilization by Polarization Spectroscopy of a Reflecting Reference Cavity", Optics Communications, vol. 35, No. 3, Dec., 1980, pp. 441–444.

* cited by examiner

Primary Examiner—John D. Lee  
(74) Attorney, Agent, or Firm—Oblon, Spivak, McClelland, Maier & Neustadt, P.C.

(57) ABSTRACT

A laser light generating apparatus is provided with a laser light source, a phase modulator, a signal generating unit for applying a modulating signal to the phase modulator, and resonators. A nonlinear optical element is provided in the resonator, and an optical path length varying means for changing length of an optical path of each of the resonators is provided. Error signals are obtained using detection signals of photodetectors for receiving light from the resonators, respectively, and the optical path length varying means is controlled by a sideband method, whereby a control circuit having a negative feedback configuration for controlling length of the resonators is formed. Laser light is subjected to phase modulation and then inputted to the resonator, and light generated by the nonlinear optical element is inputted to the resonator so that the plurality of resonators are simultaneously held in a resonant state.

23 Claims, 7 Drawing Sheets

FREQUENCY

LASER LIGHT GENERATING APPARATUS AND METHOD

BACKGROUND OF THE INVENTION

The present invention relates to a technique for achieving stable locking using a cross modulation carrier in a laser light generating apparatus with a laser light source and a plurality of resonators.

An FM sideband method ("Pound-Drever-Hall Locking" method) is known as a method for stable locking of a resonator in a laser light generating apparatus, and is widely used for the locking of an external resonator in a range of near-infrared light to visible light.

In addition to this method, there is a method using polarization (see literature such as Hansch, Couillaud, optics Communications, 1980). For example, a locking method has been proposed which inputs laser light passed through a wave plate to a resonator, and obtains an error signal on the basis of detection signals of two beams in different polarized states from the resonator to thereby maintain a resonant state of the resonator.

However, the conventional apparatus have the following problems.

In the case of the polarization method and the like, when the amount of light inputted to the resonator or the like is changed or when an absorptive optical element (especially an element absorbing light in an ultraviolet range) is included in the resonator, for example, a wavelength offset tends to occur because characteristics of the optical element are changed with variation in temperature due to generation of heat and thus the amount of phase delay is changed. The polarization method and the like therefore have a problem in stability.

The FM sideband method or the "Pound-Drever-Hall Locking" method requires that sideband waves be generated using a phase modulator in order to generate an error signal. A high-performance phase modulator having a high transmissivity and a low operating voltage is required especially when ultraviolet light is modulated to thereby generate sideband waves. However, such a modulator is difficult to obtain. When an available phase modulator is to be used, on the other hand, a high-voltage high-frequency driving circuit and the like are required. The FM sideband method has a disadvantage of increasing cost and power consumption and thus has a problem in terms of practicality.

In a configuration using a plurality of resonators, when the resonators are to be locked simultaneously, the increase in the number of resonators results in an increase in the number of phase modulators disposed in different stages, thus causing an increase in the size and cost of the apparatus. This is because in the conventional configuration, a phase modulator is disposed in a stage preceding each of the resonators. A space for disposing the phase modulators thus becomes larger.

SUMMARY OF THE INVENTION

It is accordingly an object of the present invention to achieve stable locking in a laser light generating apparatus provided with a plurality of resonators without increasing cost and power consumption for the stable locking.

In order to achieve the above object, a laser light generating apparatus according to the present invention includes the following constituent elements:

a laser light source for outputting laser light;

a phase modulator and a signal generating unit for generating a modulating signal to be applied to the phase modulator;

a plurality of resonators including a first resonator and a second resonator disposed in a stage succeeding the first resonator;

a nonlinear optical element disposed in the first resonator;

an optical path length varying means for changing length of an optical path of each of the resonators;

an optical system disposed between the laser light source and the resonators and between two resonators for providing coupling between the laser light source and the resonators and between the two resonators;

a photodetector for receiving light from each of the resonators; and a control circuit having a negative feedback configuration for obtaining an error signal from a detection signal obtained by each photodetector and the modulating signal and controlling the optical path length varying means by an FM (Frequency Modulation) sideband method ("Pound-Drever-Hall Locking" method) using the error signal.

The laser light is inputted to the phase modulator, subjected to phase modulation, and then inputted to the first resonator, and light generated by the nonlinear optical element is inputted to the second resonator; and the light from the first resonator and the light from the second resonator are detected by the photodetectors, respectively, and the length of the optical path of each of the resonators is controlled on the basis of the error signal, whereby the plurality of resonators are simultaneously held in a resonant state.

A laser light generating method according to the present invention includes: inputting phase-modulated laser light to a first resonator and then inputting light generated by a nonlinear optical element disposed within the first resonator to a second resonator; and detecting light from the first resonator and light from the second resonator, generating an error signal from each of detection signals and a modulating signal, and thereby controlling length of an optical path of each of the resonators, whereby the plurality of resonators are simultaneously held in a resonant state.

Thus, the present invention not only enables stable locking of the resonators by using the FM sideband method but also eliminates the need for providing a phase modulator in a stage preceding each of the resonators. It is therefore possible to lock a plurality of resonators simultaneously using a smaller number of phase modulators than in the conventional configurations.

DETAILED DESCRIPTION OF THE PREFERRED EMBODIMENT

The present invention relates to a laser light generating apparatus using a continuous-wave (CW) capable laser light source and a plurality of resonators, and is suitable for application to wavelength conversion over a plurality of stages, for example.

Figure 1:
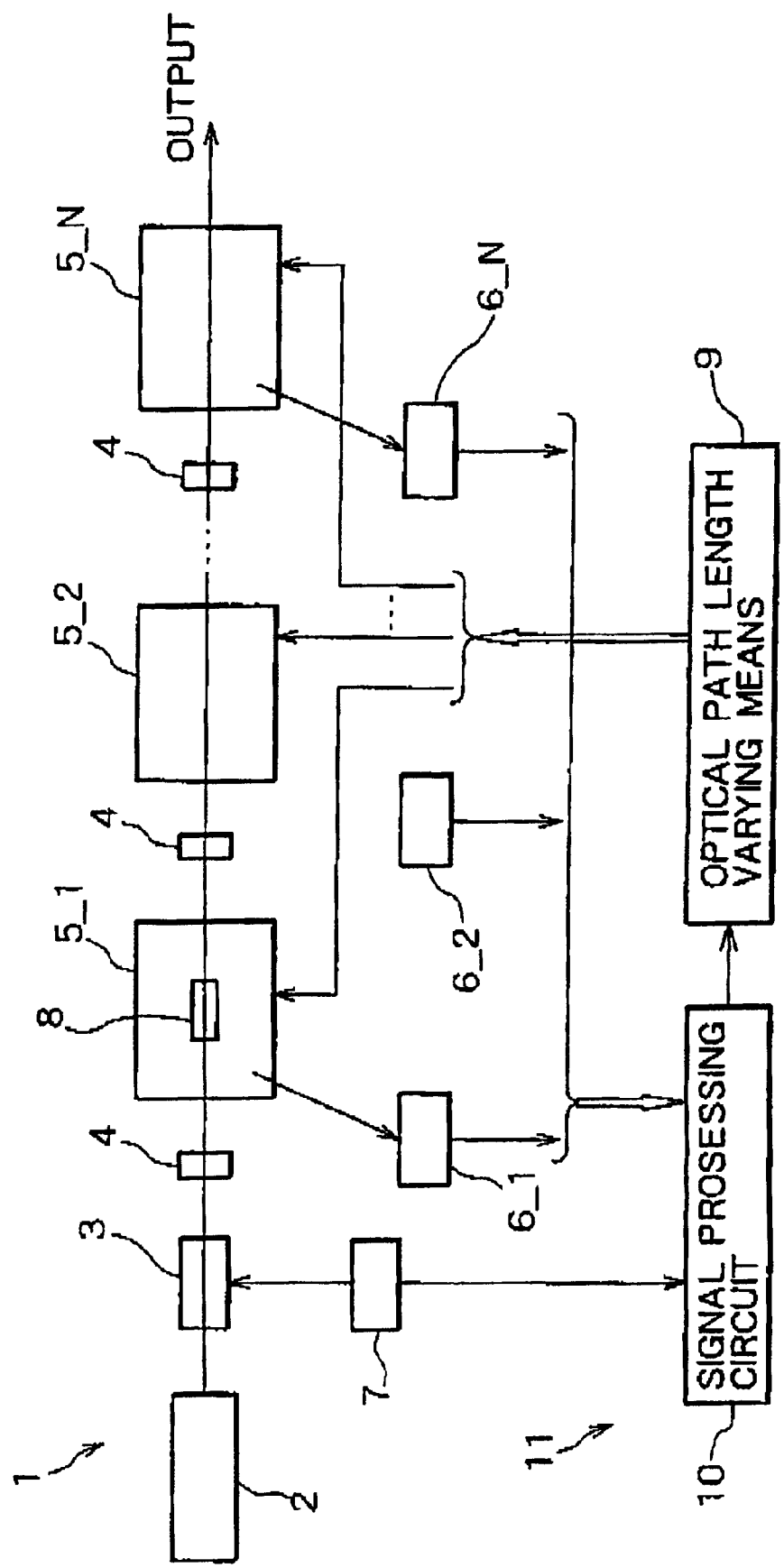
FIG. 1 is a diagram of assistance in explaining an example of fundamental configuration according to the present invention.

FIG. 1 is a diagram of assistance in conceptually explaining an example of fundamental configuration of the present invention.

A laser light generating apparatus 1 has a laser light source 2 for outputting laser light of substantially a single frequency.

The laser light is passed through a phase modulator 3, an optical system 4, and then supplied to a plurality of resonators 5_X (X=1, 2, . . . , N). Incidentally, the optical system 4 may include a lens, a prism, a mirror and the like for mode matching, as well as a dichroic mirror, an absorption filter and the like, as required, for selecting and transmitting light to enter a resonator in the next stage and thereby blocking undesired light. The phase modulator 3 is provided with a signal generating unit 7 (having a local oscillator for generating an oscillation signal) for generating a modulating signal to be applied to the phase modulator 3.

The plurality of resonators 5_X (X=1, 2, . . . , N) are arranged in a row, and include a first resonator (denoted by "5_1," for example) and a second resonator (denoted by "5_2," for example) disposed in a stage succeeding the first resonator. It is to be noted that the first resonator does not necessarily need to be the resonator in the first stage; any resonator may be the resonator in the first stage. Also, the second resonator may be any resonator as long as the resonator is situated in a stage succeeding the first resonator. However, a nonlinear optical element (or a nonlinear optical crystal) 8 is disposed in the first resonator. Elements for wavelength conversion involving second harmonic frequency light generation, sum frequency generation and the like are recited as examples of the nonlinear optical element 8; however, other elements (elements for recording and the like) may also be used.

At least the first and second resonators of the resonators are provided with an optical path length varying means 9 for varying optical path length of each of the first and second resonators. The optical path length varying means 9 controls the position and attitude of a component (a mirror or an optical element) of the resonator by using a piezoelectric element, an actuator such as a VCM (voice coil motor) and the like, or applies a voltage or the like to a crystal and thereby controls optical characteristics (such as an optical path length and/or an index of refraction), for example.

Optical systems 4, 4, . . . for mode matching disposed between the laser light source 2 and the resonators and between two resonators efficiently couple required light between the laser light source 2 and the resonators and between the two resonators.

Photodetectors 6_X (X=1, 2, . . . , N) are provided to receive light from the resonators. Incidentally, while a type of photodetector that detects light reflected from a resonator and a type of photodetector that detects light transmitted by a resonator may be recited, the former type is preferable from a viewpoint of magnitude of the detection signal.

A signal processing circuit 10 receives a detection signal obtained by each of the photodetectors 6_X and the modulating signal (oscillation signal of a predetermined frequency) generated by the signal generating unit 7, makes synchronous detection, and then obtains an error signal. The signal processing circuit 10 sends the control signal to the optical path length varying means 9. Thus, a control circuit 11 having a negative feedback configuration for controlling the optical path length varying means 9 by the FM sideband method using the error signal is formed.

In this configuration, laser light emitted from the laser light source 2 enters the phase modulator 3 to which the modulating signal generated by the signal generating unit 7 is applied, is thereby subjected to phase modulation, passes through the optical system 4, and then enters the first resonator (5_1, for example). Light generated by the nonlinear optical element 8 within the resonator then enters the second resonator (5_2, for example).

Light (reflected light or transmitted light) from the first resonator and the second resonator is detected by the photodetectors 6_1 and 6_2, respectively. The optical path length varying means 9 controls the optical path length of each of the resonators on the basis of an error signal obtained by detection of the signal processing circuit 10 (specifically, variably controls the optical path length of each of the resonators so that the error signal becomes zero or a targeted value). The plurality of resonators are thereby simultaneously held in a resonant state (so-called locked state).

The modulating signal applied to the phase modulator 3 may be a modulating signal of different frequencies or a modulating signal of a single frequency. Also, while in FIG. 1, the modulating signal from the signal generating unit 7 is supplied to the single phase modulator 3, the present invention is not limited to this, and a plurality of phase modulators to which the modulating signal is applied may be used. It is required, however, that the single phase modulator or the plurality of phase modulators be disposed on an optical path between the laser light source and the first resonator, and the light outputted from the first resonator enter the second resonator without being subjected to phase modulation by a phase modulator.

Figure 2:
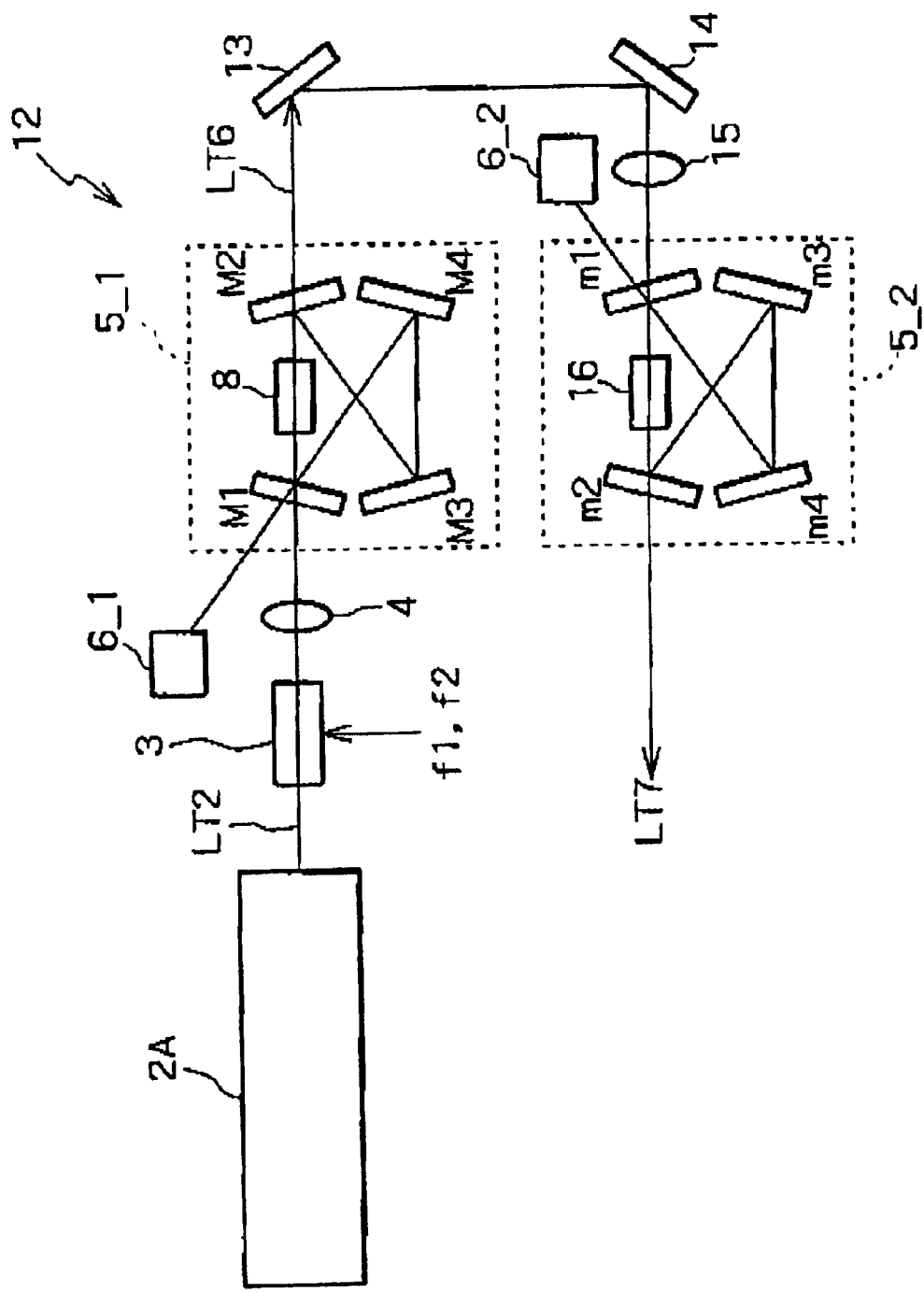
FIG. 2 is a diagram showing an example of configuration according to the present invention in conjunction with FIG. 3, and showing main parts of a general configuration.

FIG. 2 shows an example 12 using a single phase modulator and configured to be able to lock two wavelength converting resonators simultaneously by the FM sideband method.

The present example uses a laser light source 2A for outputting infrared light (for example wavelength λ=1064 nm) in a longitudinal single mode. The output light LT2 passes through a phase modulator 3 (for example KTP or the like). The phase modulator 3 is supplied with a modulating signal having different frequencies (the frequencies will be described as "f1" and "f2"), for example.

The light passed through the phase modulator 3 goes through an optical system 4 including a lens and the like, and then enters a first resonator 5_1. Incidentally, in this case, the supposed intrinsic modes of the entering light and the resonator 5_1 coincide well with each other (so-called mode match).

The resonator 5_1 is formed by an entrance mirror M1, a plurality of mirrors M2, M3, and M4 used as required, and a nonlinear optical element 8. Specifically, as shown in FIG. 2, the entrance mirror M1 and the output mirror M2 are disposed on a main optical path, and the nonlinear optical element 8 is disposed between the entrance mirror M1 and the output mirror M2. The mirror M3 is situated on the M1 side, and the mirror M4 is disposed on the M2 side. The laser light that has entered the M1 is passed through the nonlinear optical element 8, reflected from the M2, M3, and M4 in that order, and then returned to the M1, thus forming the resonator. The length of a reflection optical path of the resonator 5_1 can be variably controlled by changing the position and attitude of at least one (for example M3) of the mirrors for forming the resonator by a moving means such as a VCM (voice coil motor) or a driving means utilizing a piezoelectric phenomenon of PZT or the like. In addition, a prism, a grating or the like may be moved as an optical element for forming the resonator other than the mirror. Besides, there is a method of applying a voltage to the nonlinear optical element or an electro-optical crystal to thereby change the length of the optical path.

A part of the light reflected from the mirror M4 combined with the light reflected from the mirror M1 is received by a photodetector 6_1 for signal detection.

Output light LT6 of the resonator 5_1 is reflected by mirrors 13 and 14, then passes through an optical system 15 for mode matching, and enters a second resonator 5_2.

As with the resonator 5_1, for example, the resonator 5_2 is formed by an entrance mirror m1, a plurality of mirrors m2, m3, and m4, and a nonlinear optical element 16. Specifically, as shown in FIG. 2, the entrance mirror m1 and the output mirror m2 are disposed on a main optical path, and the nonlinear optical element 16 is disposed between the entrance mirror m1 and the output mirror m2. The mirror m3 is situated on the m1 side, and the mirror m4 is disposed on the m2 side. The laser light that has entered the m1 from the optical system 15 is passed through the nonlinear optical element 16, reflected from the m2, m3, and m4 in that order, and then returned to the m1, thus forming the resonator. The length of a reflection optical path of the resonator 5_2 can be variably controlled by changing the position and attitude of at least one (for example m3) of the mirrors for forming the resonator by a moving means formed by a VCM or the like or a driving means of PZT or the like.

A part of the light reflected from the mirror m4 combined with the light reflected from the mirror m1 is received by a photodetector 6_2 for signal detection.

Light LT7 emitted from the mirror m2 is supplied as output light of the resonator 5_2 to the exterior thereof.

Figure 3:
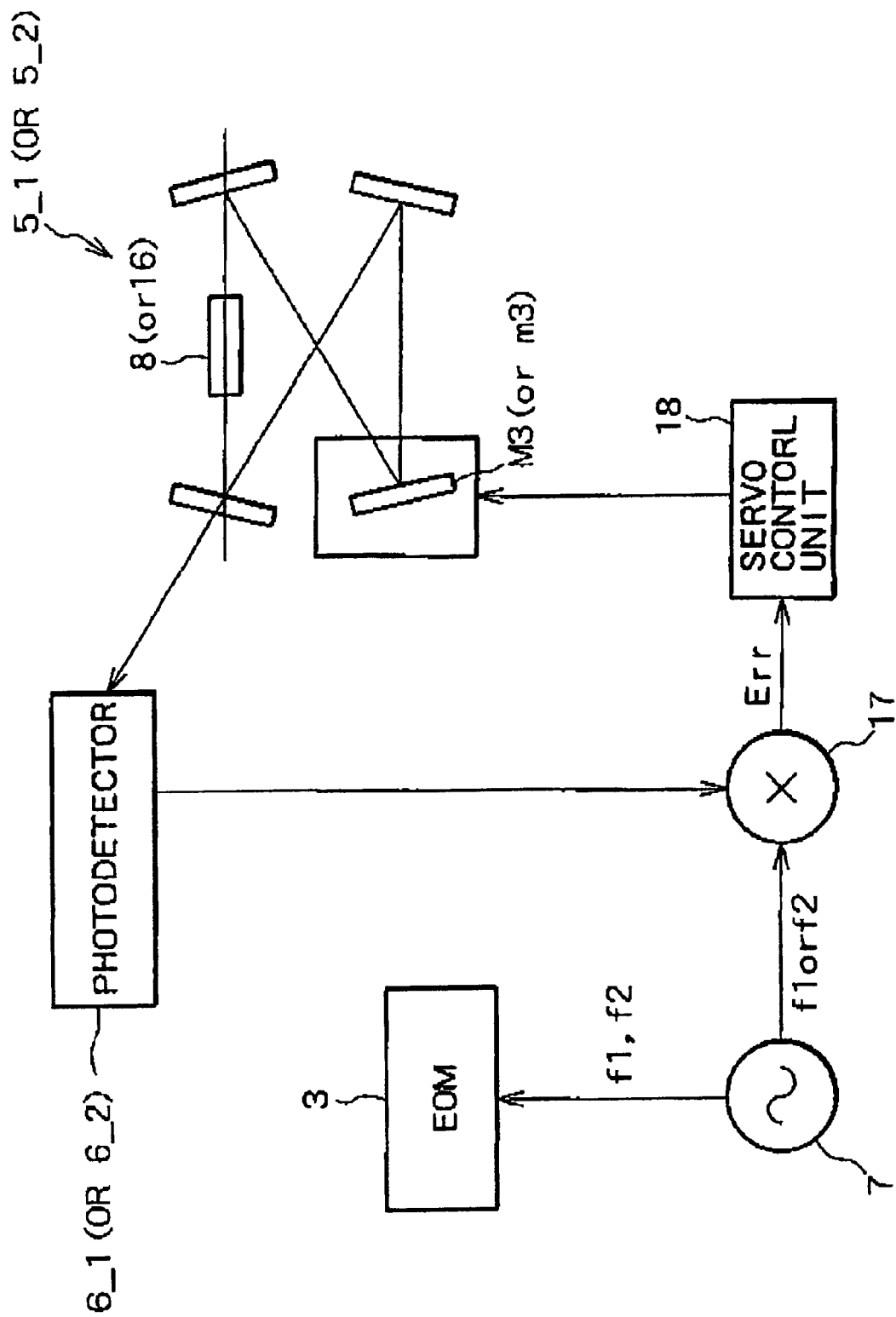
FIG. 3 is a diagram showing an example of configuration of a control system including a phase modulator and a photodetector.

FIG. 3 shows an example of fundamental configuration of a control system including the phase modulator and the photodetector. It is to be noted that since the first and second resonators are of a similar circuit configuration, parts common to both the circuits are shown as a representative of both the circuits in FIG. 3.

The signal generating unit 7 denoted by a symbol of a signal source generates the modulating signal of the frequencies f1 and f2, and applies the signal to the phase modulator 3 ("EOM" shown in FIG. 3) to subject the laser light to phase modulation as described above.

A detection signal from the photodetector (in the example shown in FIG. 3, the photodetector 6_1 for the first resonator and the photodetector 6_2 for the second resonator) and the modulating signal (a signal of the frequency f1 for the first resonator and a signal of the frequency f2 for the second resonator) are supplied to a detecting unit 17 (represented as a multiplier in the figure) for synchronous detection. An error signal (described as "Err") obtained by the synchronous detection is supplied to a servo control unit 18. Incidentally, though not shown in the figure, a so-called "Pull-in" circuit may be added to determine whether to effect locking on the basis of a signal from a total light quantity monitor.

The servo control unit 18 generates a control signal such that the level of the error signal Err becomes zero, and then controls the length of the optical path of the resonator by the signal. Specifically, in the example of FIG. 2, the position and attitude of the mirror M3 are controlled in the first resonator 5_1, and the position and attitude of the mirror m3 are controlled in the second resonator 5_2. Incidentally, a known mechanism may be used for a moving mechanism, a driving control circuit or the like of the mirror, and therefore further description of the moving mechanism, the driving control circuit or the like will be omitted. Also, a circuit necessary for signal processing, such for example as a filter necessary for extracting a high-frequency signal from the detection signal after receiving the light, is not shown in the figure (or may be considered to be included in the photodetector or the like), and only fundamental elements for the processing are shown.

When reflectivity of the mirror M1 in the foregoing first resonator 5_1 (see FIG. 2) is described as "$R_1$," and combined reflectivity of a path from the element 8 to the other mirrors (M2 to M4) and to a point immediately before the mirror M1 is described as "$R_m$," and when the optical path of the resonator is adjusted satisfactorily, the light entered from the mirror M1 and reflected from the resonator as a whole is detected by the photodetector 6_1, and the reflectivity of the resonator as a whole (described as "$R(\delta)$") is given by the following equation:

$$R(\delta) = \frac{(\sqrt{R_1} - \sqrt{R_m})^2 + 4\sqrt{R_1 R_m} \sin^2 \frac{\delta}{2}}{(1 - \sqrt{R_1 R_m})^2 + 4\sqrt{R_1 R_m} \sin^2 \frac{\delta}{2}} \qquad \text{[Equation 1]}$$

The letter "$\delta$" in the above equation is "$\delta = 2\pi \cdot L_1 / \lambda$", where "$\lambda$" denotes wavelength of the light source; and "$L_1$" denotes the length of the reflection optical path of the resonator. When "$R_1 = R_m$", a state of impedance matching is obtained.

Figure 4:
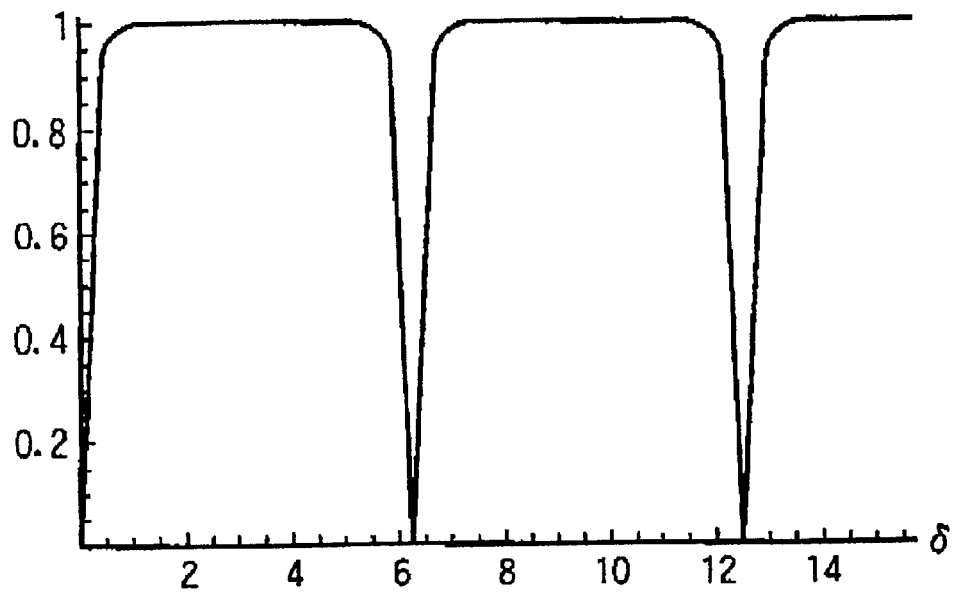
FIG. 4 is a graphical representation of δ dependence of relative reflectivity.

FIG. 4 is a graphical representation illustrating reflection characteristics ($\delta$ dependence) according to the above equation, and shows a relation between the "$\delta$" and relative reflectivity (0 to 1) using the "$\delta$" to enter the axis of abscissas and using the relative reflectivity to enter the axis of ordinates. Incidentally, for graphical curves, "$R_1 = R_m = 0.90$" in consideration of ease of view, and the finesse is set to a lower level than in actuality.

As is clear from the fact that the term of the square of the sine function $\sin(\delta/2)$ is included in the equation 1, when "$\delta = p \cdot \pi$ (p is an even number), apparent reflectivity of the resonator 5_1 is decreased, and the incident light enters the resonator and increases the light intensity within the resonator 5_1. This is referred to as a "resonant state," and maintaining the resonant state is referred to as "locking."

In order to maintain a state in which the length of the resonator satisfies the condition of "$\delta = 2 \cdot \pi \cdot L_1 / \lambda = p \cdot \pi$" against disturbances such as vibration and temperature change, a means for variably controlling the optical path length $L_1$ is required. For this purpose, the position and the like of a mirror (see M3 and m3 in FIG. 2, for example) or an optical element may be changed or an electro-optical element may be used to change an index of refraction or the like of the electro-optical element. Moving means and driving means using PZT, a VCM, a stepping motor and the like are recited as examples of the means for variably controlling the optical path length $L_1$.

An allowable frequency full width at a half maximum in transmission when the value of $\delta$ is changed by varying the optical path length of the resonator (when a half width is described as "$\delta_{0.5}$," the full width is twice "$\delta_{0.5}$,", or "$2\delta_{0.5}$") is obtained from a value at which an amount of decrease in the apparent reflectivity or in the apparent transmissivity of the resonator corresponds to half of a value at the peak point ($\delta=0$, $2\pi$, or the like) of the apparent reflectivity of the resonator, and is given substantially by the following equation:

$$2\delta_{0.5} = \frac{2(1 - \sqrt{R_1 R_m})}{(R_1 R_m)^{\frac{1}{4}}} \quad \text{[Equation 2]}$$

Incidentally, this is also obtained from a $\delta$ that makes apparent transmissivity of the resonator half of a value at the peak point of the apparent transmissivity of the resonator.

Figure 5:
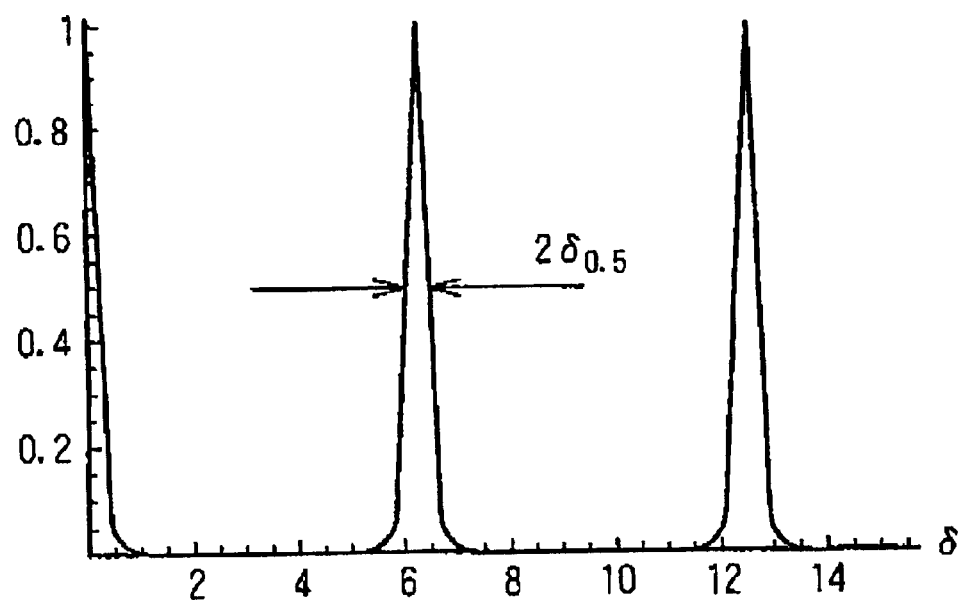
FIG. 5 is a graphical representation of δ dependence of relative transmissivity.

FIG. 5 is a graphical representation illustrating "$\delta$" dependence of relative transmissivity, and shows a relation between the $\delta$ and the relative transmissivity (0 to 1) using the $\delta$ to enter the axis of abscissas and using the relative transmissivity to enter the axis of ordinates. Incidentally, for graphical curves, "$R_1=R_m=0.90$" in consideration of ease of view, and the finesse is set to a lower level than in actuality.

As indicated by arrows in the figure, points indicating ½ of the peak value of the relative transmissivity appear on both sides of the peak. A difference (width) in the value of $\delta$ between both the points represents the allowable frequency full width at a half maximum "$2 \cdot \delta_{0.5}$".

When the FM sideband method uses the light reflected from the resonator 5_1, it is advantageous to make the frequency f1 of the modulating signal greater than the transmission half width $\delta_{0.5}$.

Figure 6:
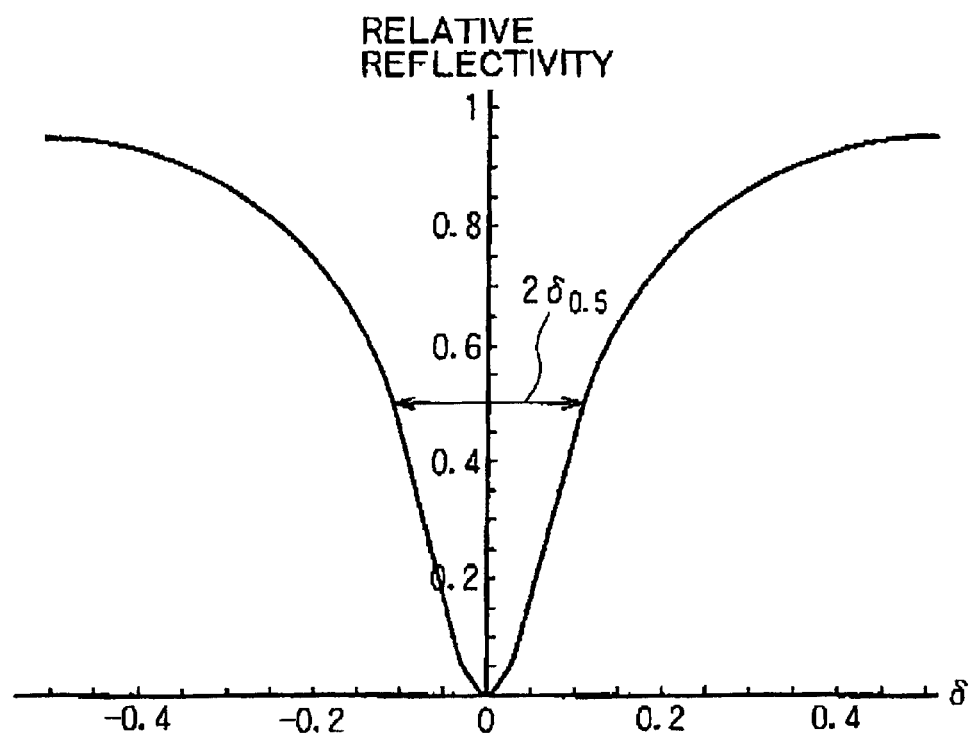
FIG. 6 is a diagram showing in enlarged dimension an important part of the δ dependence of the relative reflectivity.

FIG. 6 shows the $\delta$ dependence of the relative reflectivity, and shows in enlarged dimension a portion around $\delta=0$ in FIG. 4. Note that at $\delta=0$, relative reflectivity may not reach zero for an impedance unmatched case.

As shown in the figure, the relative reflectivity is decreased sharply in a range indicated by the full width at a half maximum "$2 \cdot \delta_{0.5}$" (a range of relative reflectivity of a half of peak value and less). Therefore, when reflected light is to be detected, setting the frequency f1 within the range is not convenient because the light is transmitted.

Figure 7:
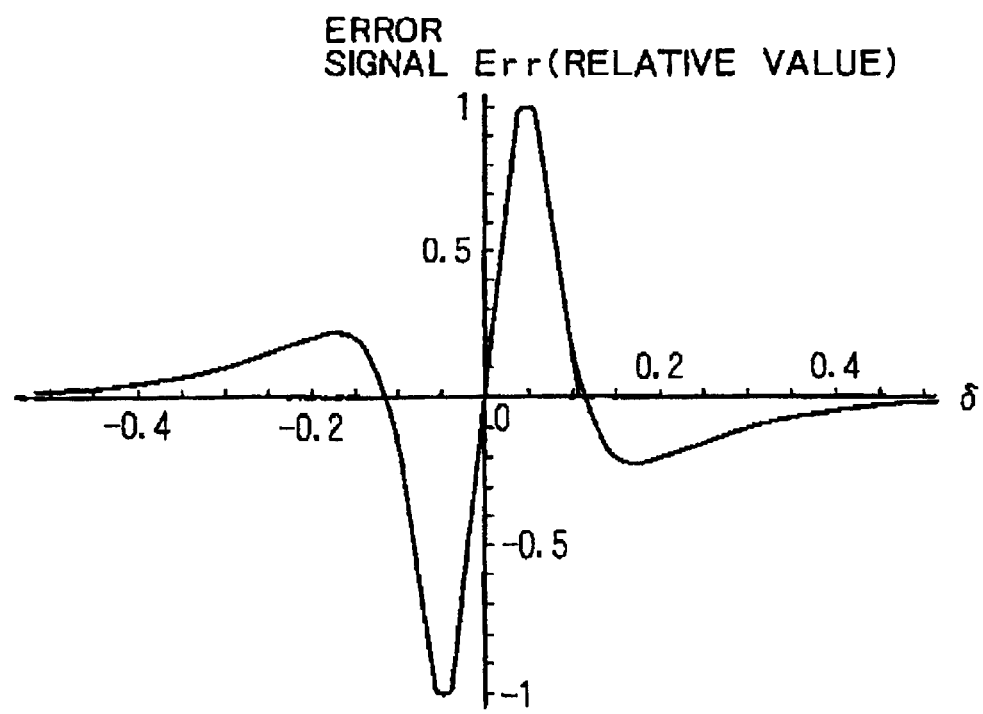
FIG. 7 is a diagram showing δ dependence of an error signal.

FIG. 7 shows in enlarged dimension an example ($\delta$ dependence) of an error signal (Err) generated on the basis of a light detection signal and a modulating signal, using the "$\delta$" to enter the axis of abscissas and using the value of the signal (representing a relative value on an arbitrary scale, so that the value itself has no special significance) to enter the axis of ordinates.

The error signal Err is obtained on the basis of the balance of a reflected double sideband wave signal (double sideband wave) when the resonance frequency of the resonator approaches the frequency of laser light, and indicates the direction and magnitude of a displacement from a resonance position ($\delta=0$) Specifically, on the right side of FIG. 7, the value of the signal increases to reach a positive peak value as moving along a positive direction of the $\delta$ axis, then decreases sharply to indicate a bottom value, and gradually approaches the $\delta$ axis. On the left side of FIG. 7, the value of the signal decreases to reach a bottom value as moving along a negative direction of the $\delta$ axis, then increases sharply to indicate a peak value, and gradually approaches the $\delta$ axis. Thus, the graphical curves substantially have a 180° rotational symmetry about an origin at $\delta=0$, and the direction and magnitude of a displacement from the resonance position can be obtained from the error signal.

Accordingly, when a negative feedback system for correcting the position or the like of a component (a mirror or the like) of the resonator is formed in the control circuit to control the length of the optical path of the resonator (to effect control so that the error becomes zero), a resonant state of the resonator can be maintained. Incidentally, as large an amount of sideband components as possible included in reflected light increases the amplitude of the error signal and thus generally raises a signal-to-noise (S/N) ratio.

For the nonlinear optical element 8 in the first resonator 5_1, KTP, BBO, LBO, and LiNbO$_3$ are used, for example. Periodically-Poled Crystals (PP-KTP and PP-LiNbO$_3$, for example), being developed in recent years, may also be used. When a wavelength converting element is used, laser light of a second wavelength obtained by subjecting laser light of a first wavelength outputted from the laser light source to wavelength conversion by the element is outputted from the first resonator 5_1, and then inputted to the second resonator 5_2. Thus, the output light resulting from an increase in traveling power by resonance and conversion of wavelength of a fundamental wave ($\lambda=1064$ nm, for example) corresponds to the LT6 (see FIG. 2).

As an example of wavelength conversion, when a crystal phase-matched for second harmonic frequency light frequency light generation (SHG or a crystal phase-matched by a means of polarization reversal or the like is used as the element 8, the fundamental wave can be converted into a wavelength half that of the fundamental wave ($\lambda=532$ nm, for example).

The output light of the first resonator (see LT6 in FIG. 2) is separated by a mirror 13 (wavelength separating mirror) or the like from light whose wavelength has not been converted, as required.

Incidentally, since the fundamental wave component subjected to the wavelength conversion by the nonlinear optical element 8 also represents a loss in the fundamental wave, the reflectivity "$R_m$" in the above equation needs to be calculated in consideration of wavelength conversion efficiency (William Kozlovsky et al., IEEE Journal of Quantum Electronics, Vol.24, No.6, p.913 (1988)).

When for example, the detection output of the photodetector 6_1 is separated into a low-frequency component and a high-frequency component, the high-frequency component being supplied to the detecting unit 17 in FIG. 3, and the detecting unit is also supplied with a signal of a frequency equal to the frequency f1 of the modulating signal from the signal generating unit 7 (local oscillator within the signal generating unit 7) to make synchronous detection for the phases of the high-frequency component and the signal of the frequency equal to the frequency f1 of the modulating signal, an error signal Err is obtained to maintain a resonant state of the first resonator 5_1. The servo control unit 18 for driving the mirror M3 forms a means for controlling the length of the resonator (means for controlling the length $L_1$ of the optical path, to be exact), and can lock the resonator on the basis of the error signal, as described above.

The mirrors 13 and 14 and the optical system 15 in FIG. 2 can be used to adjust the output light LT6 of the first resonator 5_1 to a spatial mode of the second resonator

5_2. The light that has passed through the optical system 15 is inputted to the entrance mirror m1 of the second resonator 5_2.

Characteristics of the second resonator 5_2 are basically the same as those of the resonator 5_1. When reflectivity of the mirror m1 is described as "$r_1$," and combined reflectivity of a path from the element 16 to the other mirrors and to a point immediately before the mirror m1 is described as "$r_m$," and when the optical path of the resonator is adjusted satisfactorily, the reflectivity of the resonator as a whole, in which the light is inputted from the mirror m1, is given by an equation obtained by substituting "$r_1$" and "$r_m$" for "$R_1$" and "$R_m$", respectively, in the equation 1 (as for δ, length $L_2$ of a reflection optical path, wavelength of the input light and the like of the second resonator need to be used, of course). When "$r_1=r_m$", for example, a state of impedance matching is obtained.

When a crystal for second harmonic frequency light generation (BBO, CLBO, LB4 or the like), for example, is used as the nonlinear optical element 16 disposed within the resonator 5_2, part of the input light (for example λ=532 nm) of the resonator is converted into half the wavelength (266 nm), and then outputted as the light LT7 shown in FIG. 2. Incidentally, when such wavelength conversion is to be made, "$r_m$" needs to be calculated in consideration of efficiency of the conversion.

In order to maintain a resonant state of the second resonator, it suffices to replace the frequency "f1" of the modulating signal in the description related to the first resonator with "f2", and thus read the description related to the first resonator as required. Specifically, when the detection output of the photodetector 6_2 is separated into a low-frequency component and a high-frequency component, the high-frequency component being supplied to the detecting unit 17, and the detecting unit 17 is also supplied with a signal of a frequency equal to the frequency f2 of the modulating signal from the signal generating unit (local oscillator) 7 to make synchronous detection for the phases of the high-frequency component and the signal of the frequency equal to the frequency f2 of the modulating signal, an error signal Err is obtained. The servo control unit 18 for driving the mirror m3 forms a means for controlling the length of the resonator (means for controlling the length $L_2$ of the optical path, to be exact), and can lock the resonator on the basis of the error signal Err.

Figure 8A:
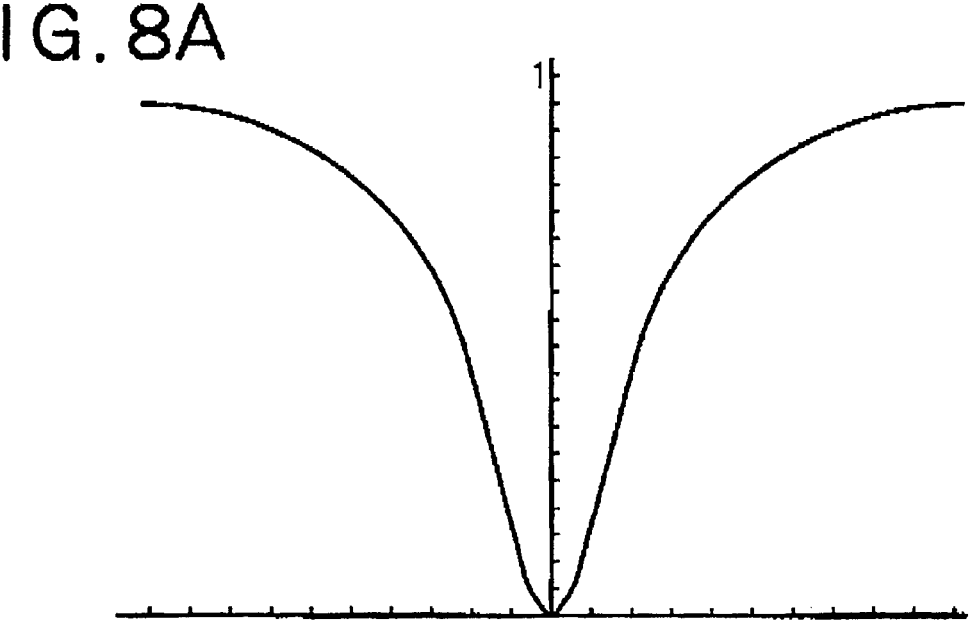
FIGS. 8A, 8B, and 8C are diagrams of assistance in explaining a relation between frequency dependence of reflectivity and modulation frequency.
Figure 8B:
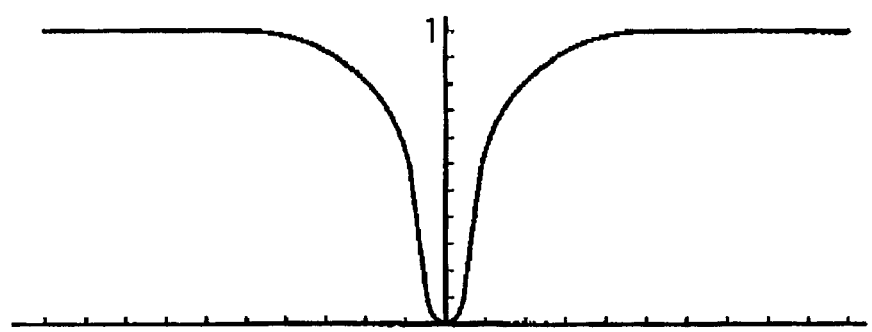
Figure 8C:
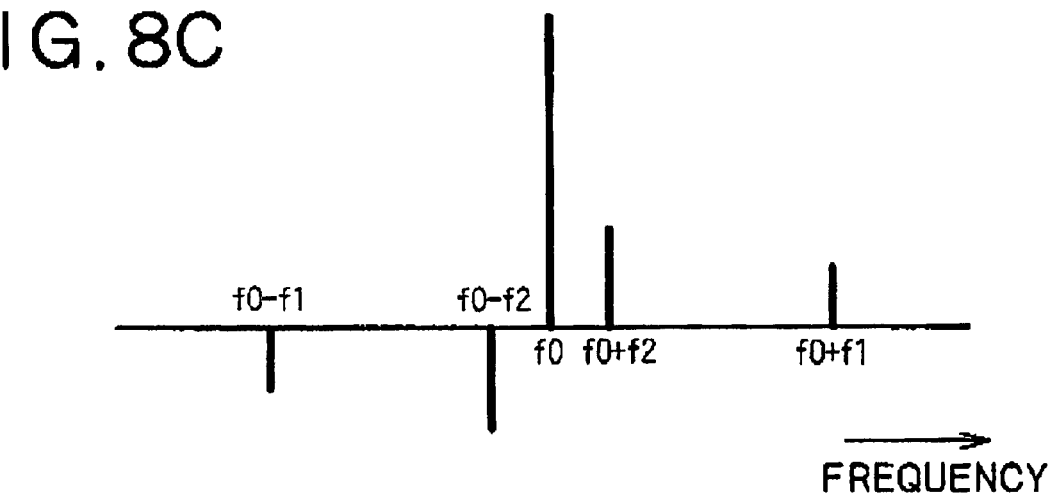

FIGS. 8A, 8B, and 8C show a relation between dependence of reflectivity of each of the resonators on frequency and modulation frequency. FIG. 8A shows dependence of the relative reflectivity of the first resonator 5_1 on input wavelength; FIG. 8B shows dependence of the relative reflectivity of the second resonator 5_2 on input wavelength; and FIG. 8C shows a spectrum of light modulated by the phase modulator 3 and inputted to the resonator 5_1. Incidentally, in FIG. 8A and FIG. 8B, consideration is given to only a range around a specific wavelength, and the axis of abscissas denotes frequency. In FIG. 8C, for simplicity of description, the frequency of the light is set to be "f0" (=c/λ, where c is the velocity of the light), and only sum frequencies and difference frequencies of the frequency and the frequencies f1 and f2 are shown (the frequencies are shown by thick lines for convenience in illustration, but no special meaning is attached to the thickness) and a sum frequency and a difference frequency of f1 and f2 and the like are not shown. Also, the frequency "f0" is shown at the center of transmission ranges of the resonators for simplicity of description (usually, the frequency f0 is not fixed at such a position unless locking is effected).

A comparison between FIG. 8A and FIG. 8B shows that in this example, the transmission width of the first resonator is greater than that of the second resonator.

As indicated in FIG. 8c by lines extending upward, an upper sideband wave of a frequency "f0+f2" formed by f2 is disposed on the right side of f0, and an upper sideband wave of a frequency "f0+f1" formed by f1 is disposed at some distance from the upper sideband wave of the frequency "f0+f2." In addition, as indicated in FIG. 8C by lines extending downward, a lower sideband wave of a frequency "f0−f2" is disposed on the left side of f0, and a lower sideband wave of a frequency "f0−f1" is disposed at some distance from the lower sideband wave of the frequency "f0−f2."

Since the frequencies "f0+f1" and "f0−f1" are situated outside the transmission range of the first resonator 5_1, the modulated light component is hardly transmitted but is reflected. Thus, when phase modulation is performed using the frequency f1 that does not pass through the first resonator, it is possible to extract light reflected from the first resonator (f0±f1), and thereby obtain an error signal with a high S/N ratio for the FM sideband method.

Since transmissivity for a light component modulated by the frequency f2 lower than f1 in the phase modulator 3 is high when the first resonator 5_1 is locked, a considerable portion of the light component is inputted to the first resonator. When it is assumed that the nonlinear optical element 8 shown in FIG. 2 is a second harmonic frequency light generating crystal to generate light of a wavelength half the wavelength of the fundamental wave, for example, a high percentage of the phase-modulated component is inputted into the first resonator to be subjected to wavelength conversion. Then the doubled frequency 2f0 (=c/λ) of the light serving as a carrier and the frequency f2 of the modulating signal interfere with each other, whereby sideband waves of 2f0±f2 are generated around 2f0. When the second resonator 5_2 has high reflectivity for these frequencies, reflected light including the component is extracted from the resonator, and thereby an error signal can be obtained. Thus, the frequency f2 is selected such that the light component of "2f0±f2" substantially passes through the first resonator 5_1 and is reflected in the second resonator 5_2. The frequency f2 can therefore be used to lock the second resonator.

Thus, in the wavelength conversion as described above, when letting the wavelength of the light outputted from the laser light source be the "first wavelength" and the wavelength of the light whose wavelength has been converted by the nonlinear optical element within the first resonator be the "second wavelength," and when the light of the wavelength is inputted to the second resonator, it is possible to lock the first resonator by using reflected light of the laser light of the first wavelength and then obtaining an error signal, and to lock the second resonator at the same time by using reflected light of the laser light of the second wavelength and then obtaining an error signal.

Thus, in FIG. 2, the two external resonators 5_1 and 5_2 are provided for the laser light source 2, and each of the resonators can be held in a resonant state by using the FM sideband method. In addition, it is not necessary to dispose a phase modulator in a stage preceding each of the resonators; it suffices to dispose the single phase modulator 3 in the stage preceding the first resonator 5_1. As for allocation of desirable modulation frequencies in that case, however, it is desirable that, as described above, the light modulated by the frequency f1 be reflected in the first resonator 5_1, and the light modulated by the frequency f2 be transmitted by the first resonator 5_1 and reflected in the second resonator 5_2 after wavelength conversion. In that case, an error signal can be generated using the light reflected in each of the two resonators. Incidentally, the use of reflected light results in a greater magnitude of a signal necessary for control and therefore enables more favorable locking than the use of transmitted light.

While in the above description, the modulating signal of the different frequencies f1 and f2 is used to achieve more stable locking of each of the resonators, the present invention is not limited to this, and a configuration may be employed in which a modulating signal of a single frequency is used to be applied to the phase modulator 3 (this is advantageous in terms of a simplified configuration and cost). That is, it suffices to satisfy a condition that part of sideband waves of modulated light be reflected in the first resonator, and the other of the sideband waves be transmitted by the first resonator and reflected in the second resonator after wavelength conversion.

Also, the modulating signal generated by the signal generating unit 7 may use any frequency as long as it is specified that the modulating signal have a first frequency component required to generate an error signal used for maintaining a resonant state of the first resonator and a second frequency component required to generate an error signal used for maintaining a resonant state of the second resonator, or the modulating signal include the frequency components as sum frequency, difference frequency, or harmonic frequency light components.

In order to prevent a sum frequency and a difference frequency that may be generated during cross modulation from interfering with the original signal, it is desirable that each of phase modulation frequencies used for the first resonator and the second resonator be not a harmonic frequency light of the other, and a ratio between the frequencies be not expressed as an integral ratio of ten figures or less, for example (these conditions are useful in selecting frequencies). Also, in a case where the sum frequency and the difference frequency are set to be different from the frequency of the original signal, it is possible to generate an error signal by using a sum frequency or a difference frequency of the sum frequency and the difference frequency.

As for the phase modulator, while there are a method of disposing a single phase modulator in front of the first resonator and applying the modulating signal to the single phase modulator, as described above, and a method of providing a plurality of phase modulators and applying the modulating signal to either one of the phase modulators, the former is preferable from a viewpoint of simplifying the configuration.

When different frequencies (f1 and f2, for example) are used, it is desirable that the first frequency component have a higher frequency than the second frequency component (f1>f2), and each of the frequency components be not a harmonic frequency light of the other. Since the FM sideband method is hardly affected by noise, however, the two-stage locking described above can be effected even when f1 is substantially close to f2 (f1≈f2) or f2 is higher than f1 (f1<f2). In these cases, however, consideration should be given to problems in that the S/N ratio is lowered, the gain is not increased and the effect of disturbances becomes greater, or a forced increase of the gain results in instability due to an increase in a noise component.

The present invention can be generalized and applied to control for simultaneously locking each of two or more resonators in a laser light generating apparatus. As the resonators, the following configurations are recited, for example.

(A) A configuration that has a gain medium within a first resonator and amplifies laser light for output.

(B) A configuration in which a nonlinear optical element disposed within a first resonator generates a second harmonic frequency light or a third harmonic frequency light.

(C) A configuration in which a nonlinear optical element disposed within a second resonator is an optical mixing element and generates light of a sum frequency or a difference frequency by mixing two pieces of laser light.

It is to be noted that the first resonator is one of the plurality of resonators, and the second resonator is a resonator other than the first resonator.

First, the configuration (A) effects injection locking to amplify the laser light.

The configuration (B) converts wavelength of an incident wave into half the wavelength (or obtains a double frequency) in the second harmonic frequency light generation, as described above, and converts wavelength of an incident wave into a third of the wavelength (or obtains a triple frequency) in the third harmonic frequency light generation.

In the configuration (C), the element is irradiated with light of two (angular) frequencies $\omega 1$ and $\omega 2$, for example, to obtain light of a sum frequency $\omega(=\omega 1+\omega 2)$ of the two frequencies.

Figure 9:
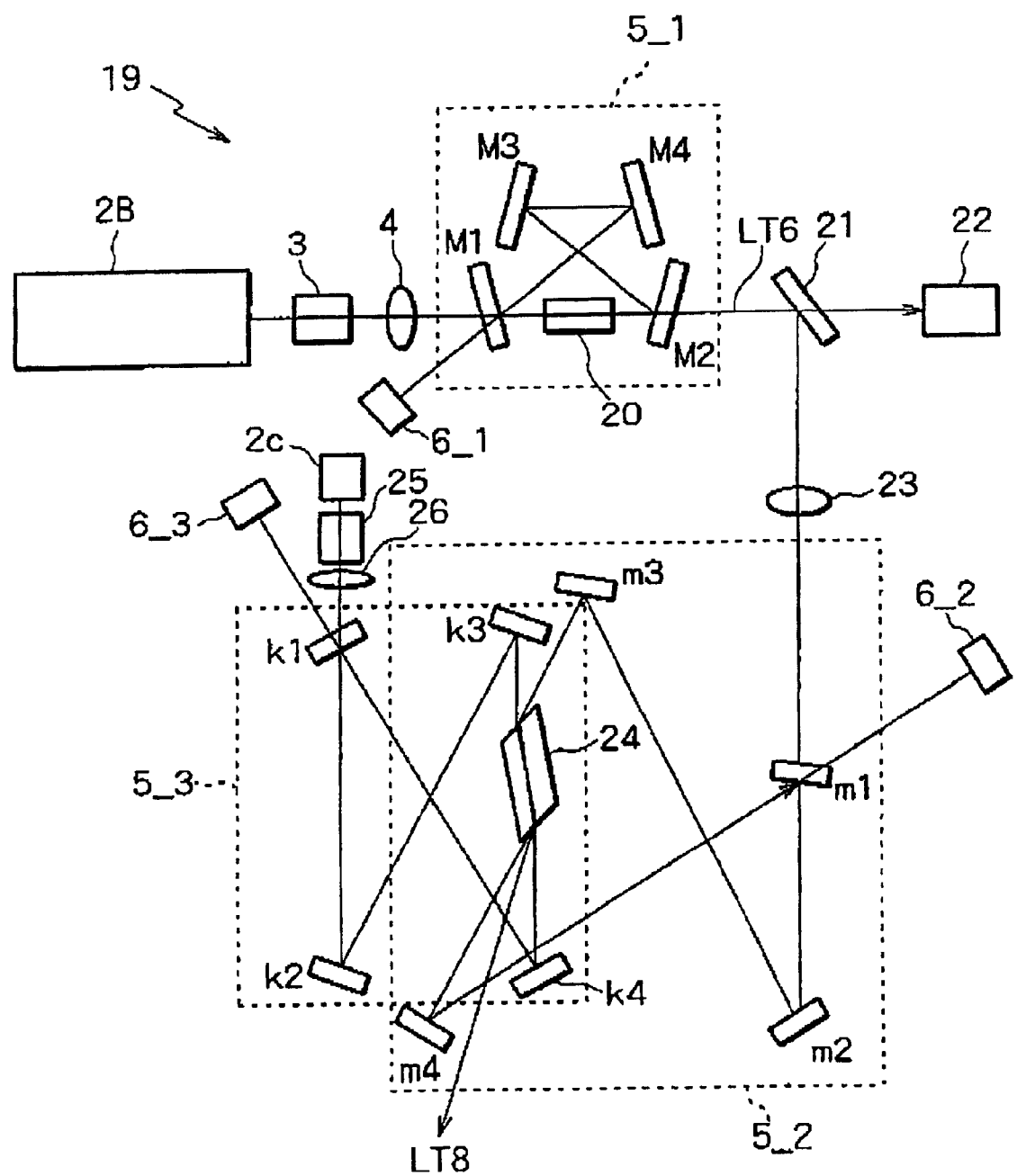
FIG. 9 is a diagram showing another example of configuration according to the present invention.

FIG. 9 shows an example 19 of such a configuration, which uses two laser light sources 2B and 2C and three resonators 5_1, 5_2, and 5_3.

Output light of the laser light source 2B (wavelength $\lambda 1=532$ nm, for example) of a single frequency is passed through a phase modulator 3 and a mode matching optical system 4, and then inputted to the first resonator 5_1.

The resonator 5_1 is provided with four mirrors M1 to M4 and a wavelength converting element 20, with the M1, the element 20, and the M2 disposed on a main optical path. An optical path in which the light reaches the M2 from the M1 via the element 20, is then reflected by the M2, M3, and M4 in that order, and returns to the M1 is formed in the resonator 5_1. A part of the light reflected by the mirror M4 is transmitted by the M1 and detected by a photodetector 6_1.

For control of resonator length of the first resonator 5_1, a moving means and a movable mechanism such as a VCM and PZT are provided to at least one of the mirrors M1 to M4.

Output light LT6 of the first resonator 5_1 is separated into two pieces by a wavelength separating mirror 21, and one of the two pieces of light is supplied to a light receiving unit 22. A photodetector (for monitoring or the like) or a beam damper (attenuator) is used for the light receiving unit 22. The other piece of light separated by the wavelength separating mirror 21 is passed through a mode matching optical system 23, and then inputted to the second resonator 5_2.

The second resonator 5_2 is provided with four mirrors m1 to m4 and a sum frequency mixing element 24. An optical path in which the light inputted from the m1 is reflected by the m2 and m3 in that order, passes through the element 24, is then reflected by the m4, and returns to the m1 is formed in the resonator 5_2. A part of the light reflected by the mirror m4 is transmitted by the m1 and detected by a photodetector 6_2. For control of resonator length of the second resonator 5_2, a moving means and a movable mechanism such as a VCM and PZT are provided to at least one of the mirrors m1 to m4.

Output light of the laser light source 2C (wavelength λ2=750 nm, for example) of a single frequency is modulated by a phase modulator 25, passed through a mode matching optical system 26, and then inputted to the third resonator 5_3.

The third resonator 5_3 is provided with four mirrors k1 to k4 and the element 24, the element 24 being shared between the resonator 5_2 and the resonator 5_3.

An optical path in which the light inputted to the k1 is reflected by the k2 and k3 in that order, passes through the element 24, is then reflected by the k4, and returns to the k1 is formed in the resonator 5_3. A part of the light reflected by the mirror k4 is transmitted by the k1 and detected by a photodetector 6_3. Incidentally, there is no necessity for control of resonator length of the resonator 5_3. However, when the control is to be effected, a moving means and a movable mechanism such as a VCM and PZT are provided to at least one of the mirrors k1 to k4.

A control method for locking the resonators 5_1 and 5_2 is the same as described above. A modulating signal of frequencies f1 and f2, for example, is applied to the phase modulator 3 so that a light component modulated by a signal of f1 is reflected in the first resonator 5_1, and a light component modulated by a signal of f2 is transmitted by the first resonator 5_1 and reflected in the second resonator 5_2. Then, the light reflected from the mirror M4 combined with the light reflected from the mirror M1 is received in the resonator 5_1 and detected by the photodetector 6_1, and the light reflected from the mirror m4 combined with the light reflected from the mirror m1 is received in the resonator 5_2 and detected by the photodetector 6_2, to obtain an error signal for each of the resonators by synchronous detection so that length of each of the resonators may be changed by controlling a movable mirror of course, a modulating signal of a single frequency rather than f1 and f2 may be applied to the phase modulator 3. Also, the frequencies of modulating signals applied to the phase modulators 3 and 25 may be determined independently so that the resonators 5_2 and 5_3 are locked separately, or the frequencies may be set to be the same so that the same local oscillator is used.

In this configuration, as a result of second harmonic frequency light generation by the wavelength converting element 20 in the first resonator 5_1, the wavelength of the output light LT6 of the resonator is half the wavelength of the fundamental wave (λ1/2=266 nm).

As a result of frequency addition by the optical mixing element 24 of the light from the laser light source 2C and the LT6, output light LT8 is obtained from the element. When the wavelength of the light LT6 is described as "λ1" anew, the wavelength (λ) of the light LT8 is obtained by substituting λ1=266 (second harmonic frequency light) and λ2=750 into "1/λ=1/λ1+1/λ2," which is obtained by rewriting "ω=ω1+ω2" into a relational equation with respect to wavelength, and thus λ is about 196 nm.

Thus, the laser light can be passed through the phase modulator to which the modulating signal is applied, then converted in wavelength by the nonlinear optical element disposed in the first resonator, and thereafter sequentially inputted to a plurality of resonators (for example, resonators disposed in a row) without being passed through another phase modulator. Also in this case, the resonators can be held in a resonant state simultaneously by the FM sideband method using an error signal generated from the modulating signal and a light detection signal for each of the resonators.

When instead of using the laser light source 2C, the output light of the laser light source 2B is used to be inputted to the third resonator 5_3 in the configuration shown in FIG. 9, output light of a triple frequency can be obtained by sum frequency generation.

For example, the light passed from the laser light source 2B through the phase modulator 3 is separated into two pieces by a half mirror or the like. One of the two pieces of light is inputted to the first resonator 5_1 via the mode matching optical system 4, while the other piece of light is inputted to the third resonator 5_3 via the mode matching optical system 26, or the phase modulator 25 and the mode matching optical system 26. A frequency (2ω) twice the fundamental frequency (ω) is obtained by the element 20 in the first resonator 5_1, and further a frequency of "ω+2ω= 3ω" is obtained by the sum frequency mixing element 24. Hence, the wavelength of the output light LT8 is one third of the original wavelength of the laser light source 2B (for example, 532/3≈177 nm).

In this case, the single phase modulator 3 may be commonly used for the first and second resonators or the first to third resonators, or the phase modulator 3 may be used for the first and second resonators and the phase modulator 25 may be used exclusively for the third resonator. As for modulating signal frequencies used in control for locking each of the resonators, a different frequency may be used for each of the resonators, or the same frequency may be used for two or more resonators.

The present invention can be carried out in various other forms. As to the width of transmission ranges of the plurality of resonators, it is desirable to set the transmission width of the first resonator wider than the transmission width of the second resonator (see FIGS. 8A and 8B).

In addition, the frequency f2 of the phase modulation signal used to maintain a resonant state of the second resonator is set substantially equal to or lower than a frequency (described as "$\Delta_1$") corresponding to the transmission width of the first resonator, and set substantially equal to or higher than a frequency (described as "$\Delta_2$") corresponding to the transmission width of the second resonator. Specifically, "f2≦$\Delta_1$" is a condition for substantial transmission by the first resonator of sideband waves formed by f2, and "f2≧$\Delta_2$" is a condition for substantial reflection of the sideband waves by the second resonator.

Furthermore, "f1≧$\Delta_1$" and "f2≦$\Delta_1$" are desirable; the former is a condition for presence of sideband waves formed by the frequency f1 in a range outside the transmission range of the first resonator, and the latter is a condition for presence of the sideband waves formed by the frequency f2 within the transmission range of the first resonator.

For stable locking of the resonators, it is required that each of the plurality of modulation frequencies or a sum frequency signal or a difference frequency signal of the plurality of modulation frequencies be in a stable phase relation with the corresponding modulating signal frequency (oscillation frequency of the signal generating unit 7). For this purpose, it is desirable to be able to adjust an amount of phase delay independently for each of the modulation frequencies in synchronous detection. For example, a delay circuit may be inserted between the photodetector 6_1 or 6_2 and the detecting unit 17 in FIG. 3 so that phase delay of the light detection signal can be adjusted.

Thus, the present invention inputs the phase-modulated laser light to the first resonator, and then inputs the light generated by the nonlinear optical element disposed in the resonator to the second resonator without passing the light through a phase modulator. The present invention also detects light from each of the first and second resonators, generates an error signal from each of the detection signals and a modulating signal, and thereby controls length of the optical path of each of the resonators. It is thus possible to hold the plurality of resonators in a resonant state simultaneously.

Accordingly, various advantages shown in the following are obtained.

It is possible to stably lock a plurality of resonators by the FM sideband method using a smaller number of phase modulators than conventional. Thus, the present invention simplifies the configuration of the apparatus, and is suitable for reduction in size and cost of the apparatus.

The present invention is useful in applications to ultraviolet light and ultraviolet radiation. For example, when the wavelength of the output light converted in wavelength by the first resonator is 400 nm or less, there is no need for using a high-performance phase modulator. Specifically, a phase modulator capable of being used for modulation of ultraviolet radiation or the like has disadvantages of requiring a high voltage, a large device size, and high cost including that of power supply, and therefore availability of the device is limited. On the other hand, the configuration described above is totally free from such problems, and requires only an inexpensive and easy-to-use phase modulator. It is therefore possible to reduce cost and time required to manufacture the apparatus.

It is possible to provide configurations and methods suitable for increasing efficiency and miniaturization. The present invention is thus useful in reducing power consumption and placement space.

While the preferred embodiments of the present invention have been described using the specific terms, such description is for illustrative purposes only, and it is to be understood that changes and variations may be made without departing from the spirit or scope of the following claims.

What is claimed is:

1. A laser light generating apparatus, comprising:
   a laser light source configured to output a laser light of a first wavelength;
   a phase modulator, to which a modulating signal of different frequencies is applied, disposed on an optical path between the laser light source and a first resonator;
   a signal generating unit configured to generate the modulating signal applied to the phase modulator;
   the first resonator and a second resonator disposed in a stage succeeding the first resonator, the laser light outputted from the first resonator being inputted to the second resonator without passing through any phase modulator;
   a nonlinear optical element disposed in the first resonator;
   means for changing an optical path length of an optical path of each of the resonators;
   at least one photodetector configured to receive the laser light from each of the resonators; and
   a control circuit having a negative feedback configuration configured to obtain an error signal, from at least one light detection signal obtained by the at least one photodetector and the modulating signal, and configured to control the means for changing an optical path length by an FM sideband method using the error signal,
   wherein the laser light is inputted to the phase modulator, subjected to phase modulation, and then inputted to the first resonator, and light generated by the nonlinear optical element is inputted to the second resonator, and
   wherein the laser light from each of the first resonator and the second resonator is detected by the at least one photodetector, and the optical path length of each of the resonators is controlled on the basis of the error signal, whereby the resonators are or can be simultaneously held in a resonant state.

2. A laser light generating apparatus as claimed in claim 1,
   wherein wavelength conversion is made by the nonlinear optical element disposed in the first resonator.

3. A laser light generating apparatus as claimed in claim 2,
   wherein another laser light of a second wavelengths obtained by subjecting the laser light of a first wavelength outputted by the laser light source to the wavelength conversion by the nonlinear optical elements is inputted to the second resonator, and
   wherein the first resonator is held in a first resonant state for the laser light of the first wavelength and the second resonator is held in a second resonant state for the another laser light of the second wavelength.

4. A laser light generating apparatus as claimed in claim 1,
   wherein the modulating signal includes a first frequency component formed by an oscillation signal configured to generate a first error signal used to maintain a first resonant state of the first resonator and a second frequency component formed by an oscillation signal configured to generate a second error signal used to maintain a second resonant state of the second resonator, and is applied to the phase modulator or either one of a plurality of phase modulators.

5. A laser light generating apparatus as claimed in claim 4,
   wherein the first frequency component is of a higher frequency than the second frequency component.

6. A laser light generating apparatus as claimed in claim 1,
   wherein the first resonator has a gain medium therewith in configured to amplify the laser light for output.

7. A laser light generating apparatus as claimed in claim 1,
   wherein the nonlinear optical element disposed within the first resonator generates a harmonic frequency light.

8. A laser light generating apparatus as claimed in claim 1,
   wherein a second nonlinear optical element disposed within the second resonator is an optical mixing element and generates light of a sum frequency or a difference frequency by mixing two pieces of laser light.

9. A laser light generating apparatus as claimed in claim 1,
   wherein the laser light passed through the phase modulator to which the modulating signal is applied, and then subjected to wavelength conversion by the nonlinear optical element disposed in the first resonator, is sequentially inputted to a plurality of resonators without being passed through any phase modulator, and
   wherein the FM sideband method uses error signals generated from the modulating signal and light detection signals for the plurality of resonators to simultaneously hold the plurality of resonators in a resonant state.

10. A laser light generating apparatus as claimed in claim 1,
wherein a first transmission width of the first resonator is wider than a second transmission width of the second resonator.

11. A laser light generating apparatus as claimed in claim 1,
wherein a phase modulation signal frequency of a phase modulation signal used to maintain a second resonant state of the second resonator is substantially equal to or lower than a first frequency corresponding to a first transmission width of the first resonator, and is substantially equal to or higher than a second frequency corresponding to a second transmission width of the second resonator.

12. A laser light generating apparatus as claimed in claim 1,
wherein a first phase modulation signal frequency of a first phase modulation signal used to maintain a first resonant state of the first resonator is higher than a first frequency corresponding to a first transmission width of the first resonator, and
wherein a second phase modulation signal frequency of a second phase modulation signal used to maintain a second resonant state of the second resonator is equal to or lower than the first frequency corresponding to the first transmission width of the first resonator.

13. A laser light generating apparatus as claimed in claim 1, further comprising:
an optical system, including a first optical element disposed between the laser light source and the first resonator and a second optical element disposed between the first and second resonators, the optical system configured to provide coupling between the laser light source and the first resonator and between the first and second resonators.

14. A laser light generating method, comprising:
outputting a laser light of a first wavelength by a laser light source;
phase-modulating the laser light by a phase modulator, to which a modulating signal of different frequencies is applied;
inputting the laser light phase-modulated by the phase modulator to a first resonator;
inputting the laser light generated by a nonlinear optical element disposed within the first resonator to a second resonator without passing the laser light through any phase modulator;
obtaining at least one light detection signal by detecting light from each of the first resonator and the second resonator; and
generating an error signal, from the at least one light detection signal and the modulating signal, and thereby variably controlling an optical path length of each of the resonators by an FM sideband method, whereby the resonators are simultaneously held in a resonant state.

15. A laser light generating method as claimed in claim 14,
wherein the laser light is subjected to wavelength conversion by the nonlinear optical element disposed in the first resonator.

16. A laser light generating method as claimed in claim 15,
wherein another laser light of a second wavelength, obtained by subjecting the laser light of a first wavelength outputted by a laser light source to the wavelength conversion by the nonlinear optical element, is inputted to the second resonator, and
wherein the first resonator is held in a first resonant state for the laser light of the first wavelength and the second resonator is held in a second resonant state for the another laser light of the second wavelength.

17. A laser light generating method as claimed in claim 14,
wherein the modulating signal is a harmonic frequency light signal of the modulating signal, a sum frequency signal of the harmonic frequency light signal and the modulating signal, or a difference frequency signal of the harmonic frequency light signal and the modulating signal.

18. A laser light generating method as claimed in claim 14,
wherein a first frequency component formed by a first oscillation signal configured to generate a first error signal used to maintain a first resonant state of the first resonator, and a second frequency component formed by a second oscillation signal configured to generate a second error signal used to maintain a second resonant state of the second resonator, are included in either the modulating signal or one of a sum frequency signal, a difference frequency signal, and a harmonic frequency light signal of the modulating signal.

19. A laser light generating method as claimed in claim 18,
wherein the first frequency component is set to be of a higher frequency than the second frequency component.

20. A laser light generating method as claimed in claim 14,
wherein, after the phase modulating step, the laser light converted in wavelength by the nonlinear optical element disposed in the first resonators sequentially inputted to a plurality of resonators without being passed through any phase modulator, and
wherein the FM sideband method, using error signals generated from the modulating signal and light detection signals for the plurality of resonators, simultaneously holds the plurality of resonators in a resonant state.

21. A laser light generating method as claimed in claim 14,
wherein a first transmission width of the first resonator is set wider than a second transmission width of the second resonator.

22. A laser light generating method as claimed in claim 14,
wherein a phase modulation signal frequency of a phase modulation signal used to maintain a second resonant state of the second resonator is set substantially equal to or lower than a first frequency corresponding to a first transmission width of the first resonator, and is set substantially equal to or higher than a second frequency corresponding to a second transmission width of the second resonator.

23. A laser light generating method as claimed in claim 14,
wherein a first phase modulation signal frequency of a first phase modulation signal used to maintain a first resonant state of the first resonator is higher than a first frequency corresponding to a first transmission width of the first resonator, and wherein a second phase modulation signal frequency of a second phase modulation signal used to maintain a second resonant state of the second resonator is equal to or lower than the first frequency corresponding to the first transmission width of the first resonator.

* * * * *